United States Patent
McCain et al.

(10) Patent No.: US 6,353,947 B1
(45) Date of Patent: Mar. 12, 2002

(54) MATTRESS COVERINGS

(75) Inventors: Ricky A. McCain; John W. Whitley, both of Monroe, NC (US)

(73) Assignee: Perfect Fit Industries, Inc., Monroe, NC (US)

( * ) Notice: Subject to any disclaimer, the term of this patent is extended or adjusted under 35 U.S.C. 154(b) by 0 days.

(21) Appl. No.: 09/455,857

(22) Filed: Dec. 7, 1999

Related U.S. Application Data (63) Continuation-in-part of application No. 08/850,959, filed on May 5, 1997, now abandoned, which is a continuation of application No. 08/673,899, filed on Jul. 1, 1996, now Pat. No. 5,625,912, which is a continuation-in-part of application No. 08/319,472, filed on Oct. 6, 1994, now Pat. No. 5,530,979, which is a continuation-in-part of application No. 08/045,643, filed on Apr. 9, 1993, now Pat. No. 5,325,555.

(51) Int. Cl.[7] .............................. A47G 9/04; A47G 9/02
(52) U.S. Cl. ................................. 5/500; 5/497
(58) Field of Search ...................... 5/495–502

(56) References Cited

U.S. PATENT DOCUMENTS

| | | | |
|---|---|---|---|
| 286,037 | A | 10/1883 | Mayall |
| 750,780 | A | 1/1904 | O'Brien |
| 1,462,279 | A | 7/1923 | Guinzburg |
| 1,825,909 | A | 10/1931 | Levi |
| 2,045,630 | A | 6/1936 | Bratman |
| 2,066,428 | A | 1/1937 | Straus |
| 2,112,892 | A | 4/1938 | Hardie et al. |
| 2,142,336 | A | 1/1939 | Selinger |
| 2,162,755 | A | 6/1939 | Shauer |
| 2,197,188 | A | 4/1940 | Lilley |
| 2,245,779 | A | 6/1941 | Heil |
| 2,302,259 | A | 11/1942 | Rothfuss |

(List continued on next page.)

FOREIGN PATENT DOCUMENTS

| | | |
|---|---|---|
| CA | 508069 | 12/1954 |
| DE | 28 00 586 A1 | 7/1979 |
| DE | 36 35 417 A1 | 4/1988 |
| EP | 0425466 | 5/1991 |
| FR | 2694177 A1 | 2/1994 |
| GB | 701899 | 1/1954 |
| GB | 891355 | 3/1962 |
| JP | 03-244415 | 10/1991 |

OTHER PUBLICATIONS

"Sack–ette" box spring cover, Perfect Fit Industries, Inc., Monroe, NC, 1980, two photocopy sheets (of inner and outer sides at traverse seam).
Sears Catalog, Fall/Winter, 1981, p. 1427.
Sears Catalog, Spring/Summer, 1983, p. 1258.
Sears Catalog, Fall/Winter, 1984, 1454.
Sears Catalog, Welcome America . . . , p. 1179.
Package Insert No. 913864 for *Flexwall Bedsack Mattress Pad*, Perfect Fit Industries, Inc., Monroe, NC, Feb., 1993.

*Primary Examiner*—Alexander Grosz
(74) *Attorney, Agent, or Firm*—Akin, Gump, Strauss, Hauer & Feld, L.L.P.

(57) ABSTRACT

A mattress covering adapted for fitted disposition over the top, sides, ends and corners of mattresses. An inelastic, generally rectangular top portion with an outer periphery is dimensioned to at least substantially cover the top surface of mattresses of at least one predetermined standard top surface size. An inelastic side skirt extends transversely to the top portion from the outer periphery of the top portion around the entire outer periphery of the top portion. An inelastic panel extends away from a periphery of the side skirt remote from the top portion and entirely around the side skirt periphery. The inelastic panel is separate and different from the side skirt and is attached to the periphery of the side skirt remote from the top portion. A first elastic cord is secured with the inelastic panel at a periphery of the panel remote from the side skirt.

4 Claims, 6 Drawing Sheets

U.S. PATENT DOCUMENTS

| | | |
|---|---|---|
| 2,414,927 A | 1/1947 | Chapman |
| 2,528,313 A | 10/1950 | Kessler |
| 2,569,627 A | 10/1951 | Black |
| 2,605,483 A | 8/1952 | Ridenhour |
| 2,624,893 A | 1/1953 | Harris |
| 2,696,872 A | 12/1954 | Kurland et al. |
| 2,778,412 A | 1/1957 | Trubitt |
| 2,793,683 A | 5/1957 | Trubitt |
| 2,856,615 A | 10/1958 | Cirocco |
| 2,942,280 A | 6/1960 | May, Jr. |
| 3,020,566 A | 2/1962 | Anderson et al. |
| 3,142,072 A | 7/1964 | Goodson, Jr. |
| 3,181,179 A | 5/1965 | Roddey, Jr. |
| 3,273,175 A | 9/1966 | Anderson et al. |
| 3,290,702 A | 12/1966 | Seltzer |
| 3,795,019 A | 3/1974 | Fragas |
| 3,906,559 A | 9/1975 | Bahr |
| 3,999,233 A | 12/1976 | Morris |
| 4,042,986 A | 8/1977 | Goodman et al. |
| 4,422,195 A | 12/1983 | Russo et al. |
| 4,606,964 A | 8/1986 | Wideman |
| 4,651,370 A | 3/1987 | Vitale |
| 4,672,702 A | 6/1987 | Isham |
| 4,682,555 A | 7/1987 | Bierbaum et al. |
| 4,703,530 A | 11/1987 | Gusman |
| 4,704,753 A | 11/1987 | Lunt |
| 4,727,608 A | 3/1988 | Joyce |
| 4,734,947 A | 4/1988 | Vitale |
| 4,742,788 A | 5/1988 | Dugan |
| 4,744,118 A | 5/1988 | Lunt |
| 4,756,942 A | 7/1988 | Aichele |
| 4,757,564 A | 7/1988 | Goodale |
| 4,801,482 A | 1/1989 | Goggans et al. |
| 4,841,588 A | 6/1989 | Harbin et al. |
| 4,962,546 A | 10/1990 | Vitale |
| 4,980,941 A | 1/1991 | Johnson, III |
| 4,985,953 A | 1/1991 | Seago |
| 5,046,207 A | 9/1991 | Chamberlain |
| 5,127,115 A | 7/1992 | Williams et al. |
| 5,271,112 A | 12/1993 | Bible et al. |
| 5,325,555 A | 7/1994 | Whitley |
| 5,530,979 A | 7/1996 | Whitley |
| 5,625,912 A | 5/1997 | McCain et al. |
| 5,636,393 A | 6/1997 | Zafiroglu et al. |
| 5,996,148 A | 12/1999 | McCain et al. |

MATTRESS COVERINGS

RELATED APPLICATION

The present application is a continuation-in-part of U.S. patent application Ser. No. 08/850,959 filed May 5, 1997, now ABN which is a continuation of U.S. patent Ser. No. 08/673,899 filed Jul. 1, 1996 U.S. Pat. No. 5,625,912, which is a continuation-in-part of U.S. patent Ser. No. 08/319,472 filed Oct. 6, 1994 U.S. Pat. No. 5,530,979, which is a continuation-in-part of U.S. patent Ser. No. 08/045,643 filed in Apr. 9, 1993 U.S. Pat. No. 5,325,555.

BACKGROUND OF THE INVENTION

The present invention relates generally to mattress coverings, such as mattress pads and sheets, and, more particularly, to relatively inexpensive, fitted mattress coverings capable of practical and effective use with mattresses of a standard top surface sizes and a range of heights.

Fitted mattress pads and sheets are commonly available in various forms. The simplest form is one having the top portion and a side skirt formed of the same piece of material and having an elastic strap or cord located around the lowermost periphery of the side skirt to draw the lowermost end of the covering under the mattress and to attempt to retain the covering in a fitted condition on the mattress. Such coverings have the advantages of ease of manufacture and a consistent appearance with the sides being of the same material as the top. They have the disadvantage, however, of having only a single elastic band along their lowermost periphery to retain an otherwise inelastic covering on mattresses which are being sold more frequently in varying heights, including relatively significant heights of one foot or more. They have a further disadvantage of being expensive to manufacture if the top panel material, which is typically a higher quality textile material such as a quilted material or a higher thread count cotton or cotton blend material, extends down along the sides of the covering sufficiently to cover the sides of mattresses of the greatest heights (thicknesses) currently being sold, so that the coverings can be used with mattresses of a given predetermined top size (e.g. standard, queen, king, etc.) regardless of the mattress height (thickness).

The variation and overall increase in heights of mattresses has led to the introduction of another form of fitted mattress covering, a mattress pad that has a quilted top and a side skirt made of another material. The side skirt is a foot or more in height to cover the sides of all or at least substantially all mattresses being sold and is elasticized over its entire height. In addition, a heavier elastic band or cord is also attached to the lowermost periphery of the skirt as with the original coverings. Such pads have been made with skirts formed by joining with a conventional, inelastic textile material layer, a layer of a special, non-woven, elastic sheet material. Such pads have also been made with side skirts formed from a single layer of inelastic material, which is elasticized by being stitched with multiple (e.g. six or more) uniformly spaced parallel rows of elastic threads sewn into the otherwise inelastic, single skirt material layer. Such pads have also been made using side skirt material which is itself knitted or woven from elastic thread.

All three forms of skirt construction offer elasticity over the full height of the skirt. It has been found that providing elasticity over the full height of the skirt provides a neat, gathered appearance and improves mattress cover retention due to the ability of the elasticized material to grip the side walls of the mattress in addition to any gripping provided by the elastic cord around the lowermost periphery of the skirt.

It has further been found that an acceptable degree of fit and retention of mattress pads can be achieved if some of the length of the side skirt of the mattress pad extending from the top is provided by a band of inelastic material closely fitted to the sides of the mattress. This band can be provided by supplying a one-piece, rectangular top portion with four rectangular panels extending from the edges of the top portion. The panels are turned transversely to the top portion and seamed together forming an upper portion of the side skirt. A second band of elasticized inelastic material is attached to the lower periphery of the upper skirt portion to complete the skirt. The lower band is elasticized as noted above by bonding to a band of inelastic fabric, a layer of a non-woven, elastomeric material coextensive with the band, or by stitching several rows of elastic thread into the band or by providing a band knitted or woven from elastic threads. Again, a heavier elastic cord is attached to the lower most periphery of the second band as with the other mattress coverings. It has been found that an upper skirt portion seamed at four corners so as to provide a closed loop of inelastic material extending generally perpendicularly to the top portion of the pad and closely fitting around a mattress on which the pad is mounted, combined with the relatively lighter elastic grip of the lower band of elasticized material and traditionally heavier elastic cord around the bottom of the skirt, also provided a sufficient grip along the height of the skirt for such covers to remain in place when used with mattress of varying heights.

While there are other differences among these mattress coverings, at least one factor which is significant in distinguishing these constructions from one another is their cost of manufacture. This factor is becoming ever more important as a significant portion of the commercial market for these coverings is controlled primarily if not exclusively by price. Thus, the least expensive construction of such covers which still provides an appearance and gripping performance acceptable to distributors and consumers, is very valuable.

SUMMARY OF THE INVENTION

In one aspect, the invention is a mattress covering adapted for fitted disposition over the top, sides, ends and corners of mattresses of standard top surface sizes comprising an inelastic, generally rectangular top portion having an outer periphery dimensioned to at least substantially cover the top surface of mattresses of at least one predetermined standard top surface size; a side skirt formed, apart from any seams, by a single layer of inelastic textile material joined with the outer periphery of the generally rectangular top portion and extending transversely from the outer periphery of the top portion around the entire outer periphery of the top portion in a closed loop; a first elastic cord joined with and extending at least partially around a elastic cord joined with and extending at least partially around a periphery of the side skirt remote from the top portion; and a second elastic cord positioned against and joined to only one of two-major opposing sides of the side skirt, the second elastic cord further being located on the side skirt between and spaced apart from the first elastic cord and the outer periphery of the top portion.

In another aspect, the invention is a mattress covering adapted for fitted disposition over the top, sides, ends and corners of mattresses of standard top surface sizes comprising an inelastic, generally rectangular top portion having an outer periphery dimensioned to at least substantially cover the top surface of mattresses of at least one predetermined standard top surface size; a side skirt made formed by a single piece of inelastic textile material joined with the outer periphery of the top portion and extending transversely from the outer periphery of the generally rectangular top portion around the entire outer periphery of the top portion in a closed loop; a first elastic cord joined with and extending at least partially around a periphery of the side skirt remote from the top portion; and a second elastic cord positioned against and joined to only one of two major opposing sides of the side skirt, the second elastic cord further being located on the side skirt between and spaced apart from the first elastic cord and the outer periphery of the top portion.

In yet another aspect, the invention is a mattress covering adapted for fitted disposition over the top, sides, ends and corners of mattresses of standard top surface sizes comprising an inelastic, generally rectangular top portion having an outer periphery dimensioned to at least substantially cover the top surface of mattresses of at least one predetermined standard top surface size; a side skirt made from an inelastic textile material joined with the outer periphery of the top portion and extending transversely from the outer periphery of the generally rectangular top portion around the entire outer periphery of the top portion in a closed loop; a first elastic cord joined with and extending at least partially around a periphery of the side skirt remote from the top portion; a second elastic cord joined with the side skirt between and spaced apart from the first cord and the outer periphery of the top portion, the second elastic cord being generally flat with a thickness dimension and a width dimension perpendicular to the thickness dimension and at least five times greater than the thickness dimension, and the side skirt having a width dimension between the outer periphery of the top portion and the remote periphery of the side skirt, the width dimension of the side skirt being at least twice as great as the width dimension of the second cord.

BRIEF DESCRIPTION OF THE DRAWINGS

The foregoing summary, as well as the following detailed description of preferred embodiments of the invention will be better understood when in conjunction with the appended drawings. For the purpose of illustrating the invention, there is shown diagrammatically in the drawings, embodiments which are presently preferred as well as other alternate embodiments. It should be understood, however, that the invention is not limited to the specific methods and instrumentalities disclosed. In the drawings.

DETAILED DESCRIPTION OF THE PREFERRED EMBODIMENTS

Initially, U.S. Pat. Nos. 5,325,555, 5,530,979 and 5,625,912 are incorporated herein by reference in their entireties.

One preferred embodiment mattress covering of the present invention is illustrated in FIGS. 1–7. In this form, the mattress covering is a mattress pad 20 adapted for fitted disposition over the top, side, ends and corners of mattresses of predetermined standard top surface sizes. Pad 20 has an inelastic, generally rectangular and planar top portion 21 preferably of a conventional, multi-layer, quilted pad material. A side skirt 22 preferably is formed by a separate single piece of a single layer of inelastic textile material and is joined with and extends transversely, preferably perpendicularly from the outer periphery 21a of the generally rectangular top portion 21 around the entire outer periphery 21a of the top portion, in a closed loop. An "upper" periphery of the side skirt 22, which is proximal to the top portion 21, is attached to the outer periphery 21a of the top panel portion by suitable means such as by overlapping and sewing together the edges of the two pieces of material 21, 22 along their adjoining peripheries with conventional, non-elastic thread. Side skirt 22 has a "lower" or "outer" periphery 22a, which is located on a side of the side skirt 22 remote from the top portion 21 and opposite the periphery of the side skirt 22 proximal to and joined with the top portion periphery 21a.

Figure 1:
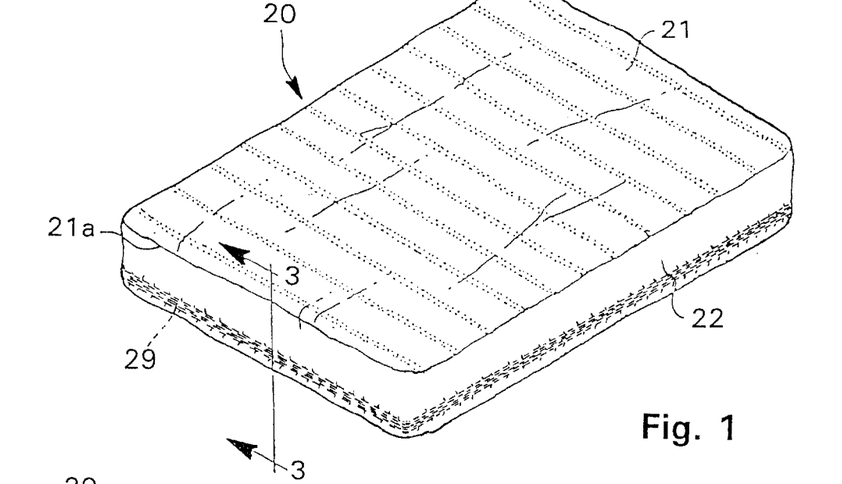
FIG. 1 is a perspective view of a mattress on which one form of the preferred embodiment of the mattress covering of the present invention is fitted.
Figure 2:
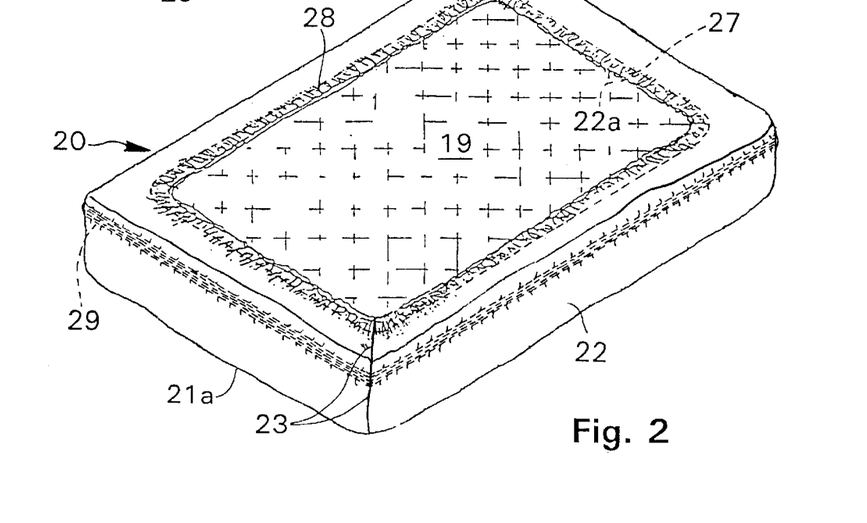
FIG. 2 is a perspective view of the mattress and covering of FIG. 1 as viewed looking toward the bottom of the mattress and covering.
Figure 3:
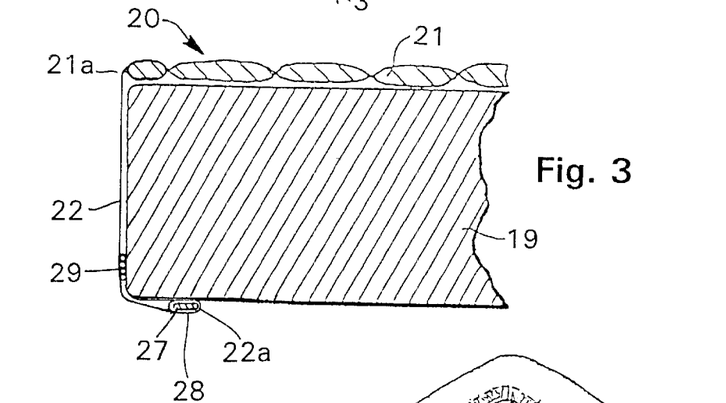
FIG. 3 is a partial vertical sectional view taken along line 3—3 of FIG. 1.

Joined with and extending at least partially around the lower periphery 22a of the side skirt 22 is a first elastic cord 27 of a type conventionally used in bedding. Cord 27 is secured to the remote periphery 22a of the inelastic side skirt 22, at a "free" edge of the inelastic side skirt 22 in a conventional way such as by being stitched with inelastic thread directly to the peripheral edge of the material of the side skirt 22 or by being stitched or otherwise located in a fold 28 or sleeve formed in or attached to the side skirt 22 at the periphery 22a of the side skirt 22 remote from the top portion 21. While the first elastic cord 27 preferably extends entirely or at least essentially entirely around the remote or lower periphery 22a of side skirt 22, it will be appreciated that the first elastic cord 27 may only extended partially around the outer periphery 22a and may be supplied in one piece or in two or more pieces which may be spread apart from one another around the periphery 22a.

A second elastic cord 29 of a type conventionally used in bedding preferably is positioned against and joined to the one of the two major opposing sides of the side skirt 22, preferably the inner side facing into the closed loop and is located on the side skirt 22 between and spaced apart from the outer periphery 21a of the top panel portion 21 and the remote periphery 22a of the inelastic side skirt 22 with the first cord 27, in a conventional fashion, for example by being stitched or adhered or attached in any other way known for the elastic cord and side skirt material selected. Finally, the lateral ends of the single piece of the single layer of material forming side skirt 22 and the ends of elastic cords 27 and 29 are joined together in any appropriate manner, such as by stitching, bonding, etc., defining a vertical seam 23 such that skirt 22 and cords 27, 29 all form closed loops around the periphery 21a of top portion 20. The side skirt material may be layered on itself at any seams.

Despite the provision of a side skirt 22 formed from an inelastic material a foot or more in height, the mattress pad 20 is capable of practical and effective use on mattresses over a relatively wide range of heights with the provision of only the two elastic cords 27 and 29 along the full height of the side skirt.

As is illustrated in FIGS. 1, 2 and 3, the mattress pad 20 is fitted on a mattress 19 of at least one predetermined standard top surface size (e.g. twin, full, standard, queen, king, western or California king, etc.). The outer periphery 21a of the top portion 21 of the mattress pad 20 is dimensioned to at least substantially cover the top surface of all mattresses of a "standard" top surface size, recognizing that there may be variations between the exact dimensions of mattresses provided in the "standard" sizes by different manufacturers, as well as acceptable manufacturing variations in such standard top sizes for each manufacturer. The top portion should have a length and width at least as great as that of the smallest mattresses known to be sold for a given standard size or an otherwise generally recognized "nominal" industry standard for that mattress size.

Suggestedly, the side skirt 22 has a width dimension between the top portion 21 and its own lower or remote periphery 22b of at least a foot and preferably about fourteen inches or more. Preferably too, the second elastic cord 29 is suggestedly located between about four (4) and about eight (8) inches from the outer periphery 21a of the top panel portion 21, preferably five to seven inches from the outer periphery 21a. In the United States, mattress heights currently range from less than about five inches to about fourteen inches or more. An "intermediate" height range of that range currently would be between about eight and about eleven inches, for example. Thus, the second elastic cord 29 is located at a height to extend under only the thinnest of mattresses heights and to otherwise extend around and grip the side walls of most other mattresses.

Figure 4:
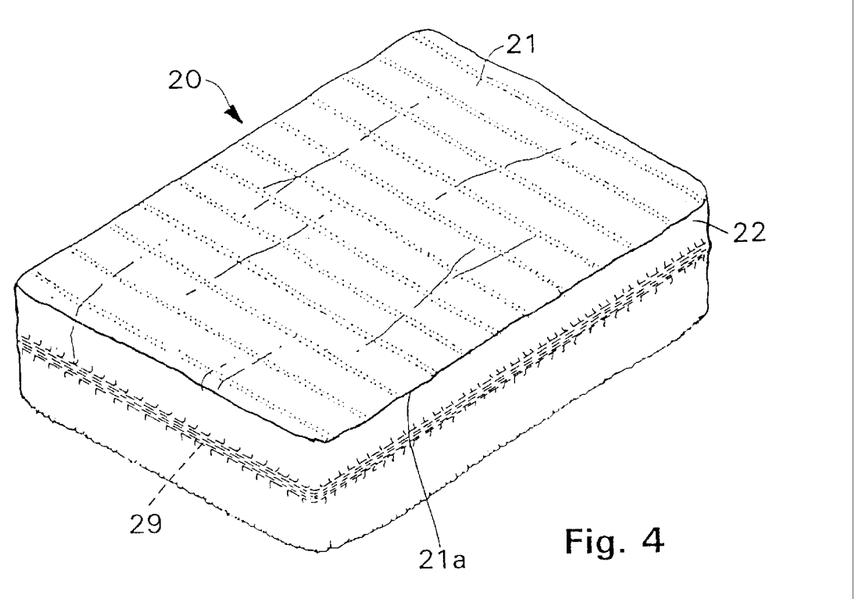
FIG. 4 is a perspective view showing the mattress covering of FIG. 1 fitted on a mattress of a higher height than the mattress of FIG. 1.
Figure 5:
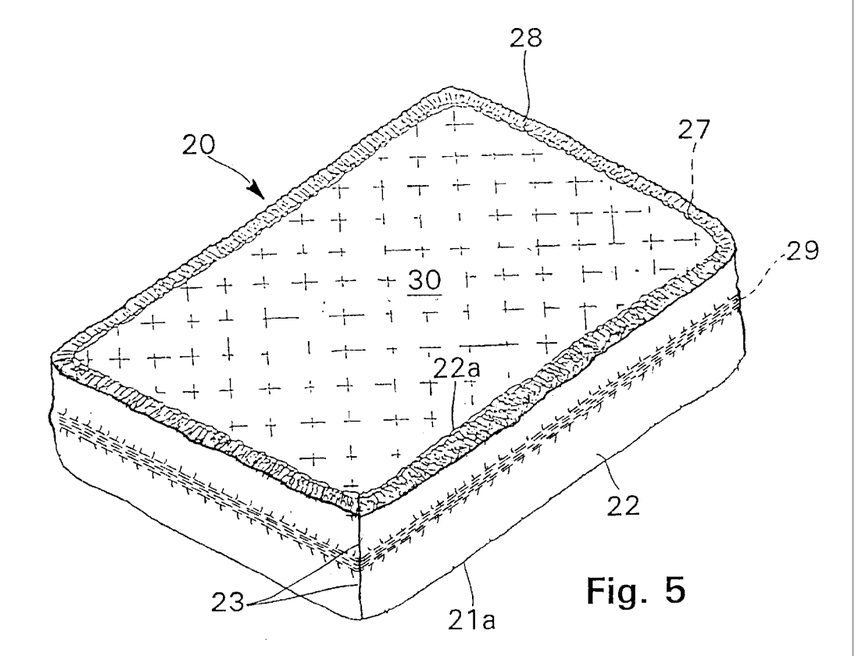
FIG. 5 is a perspective view of the mattress and covering of FIG. 4 as viewed looking toward the bottom of the mattress.

The same mattress pad 20, which is shown on an intermediate height mattress 19 in FIGS. 1, 2 and 3 (e.g. about eight to eleven inches), is shown in FIGS. 4 and 5 fitted on a mattress 30 having a thickness (height) corresponding to the generally greatest thickness (i.e., greatest height) of the standard range of heights for the mattress size for which the pad is adapted. In this installation, the side skirt 22 of pad 20 extends downwardly, at least substantially if not entirely covering the mattress sides and ends and, as shown in FIGS. 4 and 5, may even continue under the mattress 30 an extent sufficient to permit the lowermost elastic cord 27 to draw the open bottom of the skirt 22 of mattress pad 20 into fitted relation beneath the mattress 30 and to retain the pad 20 on the mattress 30. If the mattress is thicker (taller) than the height("width") of the side skirt 22, as may occur with the very thickest of current mattresses or with future, thicker mattresses, then both of the first and second elastic cords 27 and 29 will span and grip only the vertical sides and ends of the mattress 30 to retain the mattress pad 20 in position on the mattress 30.

Figure 6:
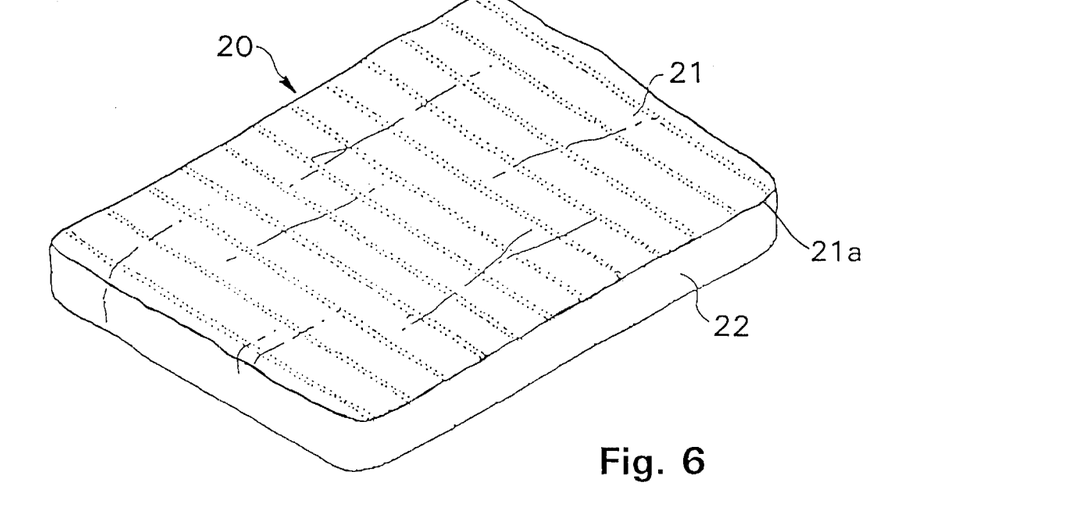
FIG. 6 is a perspective view of the mattress covering of FIG. 1 fitted on a mattress of a lower height than the mattress of FIG. 1.
Figure 7:
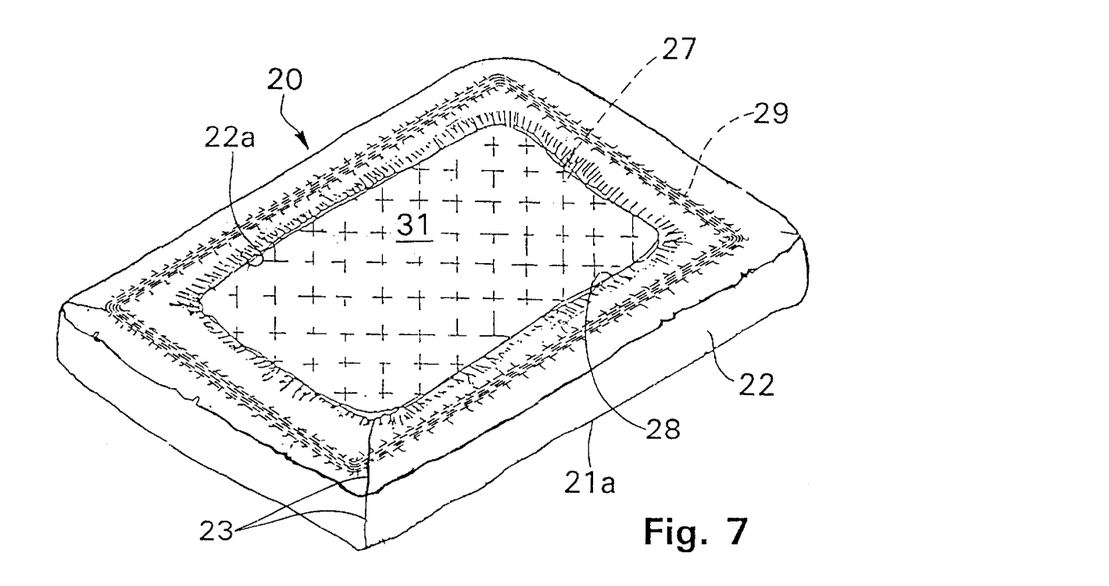
FIG. 7 is a perspective view of the mattress and covering of FIG. 6 as viewed looking toward the bottom of the mattress.

In FIGS. 6 and 7, the same mattress pad 20 is illustrated fitted on a mattress 31 of a thickness corresponding generally to the thinnest (lowest mattress height) portion of the standard range of heights for the mattress size on which the pad 20 is adapted to be used. In this installation, the side skirt 22 extends from the top panel portion 21 a distance greater than the height of the mattress 31 and, therefore, partially extends under the mattress 31, being drawn under by the second or intermediate elastic cord 29. The first, lowermost elastic cord 27 extends even further under the mattress 31 to draw the lower most end of side skirt 22 deeper under the mattress 31 and the mattress pad 20 into a more completely wrapped around position better fitted on the mattress 31.

Figure 8:
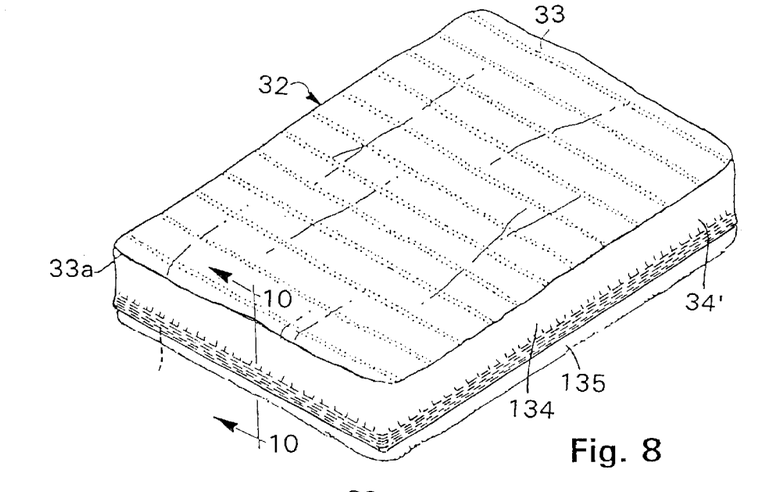
FIG. 8 is a perspective view of a mattress covering of another form of the preferred embodiment of the present invention fitted on a mattress.
Figure 9:
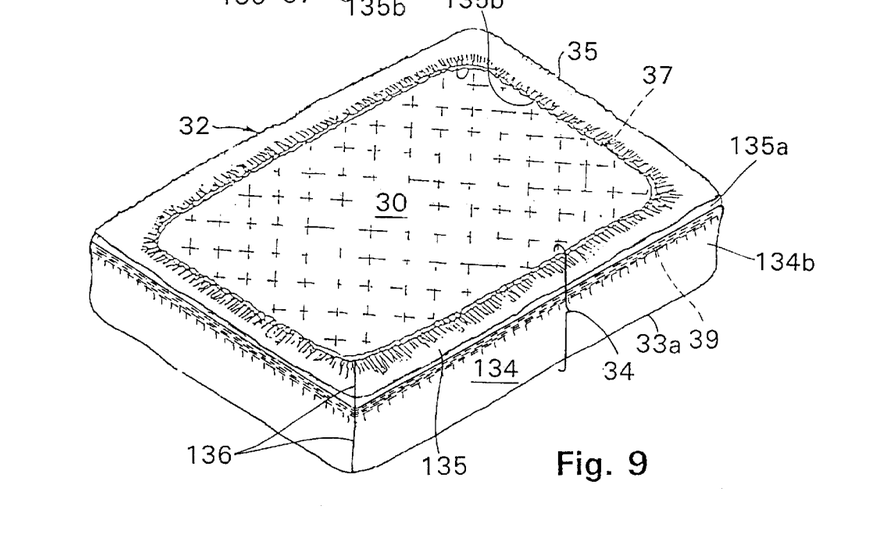
FIG. 9 is a perspective view of the mattress and covering of FIG. 8 as viewed looking toward the bottom of the mattress.
Figure 10:
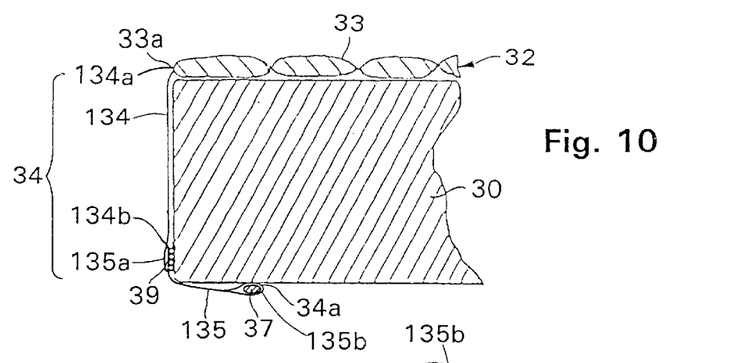
FIG. 10 is a partial vertical sectional view taken along line 10—10 of FIG. 8.

Another of the preferred embodiments of the present invention is depicted in FIGS. 8–10. Mattress pad 32 has the same type of quilted top portion 33 as the top portion 21 of mattress pad 20 of the previously described embodiment, but, instead of having a single piece of material extending the height of side skirt 22, the side skirt 34 is formed by two separate pieces of inelastic material 134 and 135. The two separate pieces of material are joined together at their adjoining peripheries 134b and 135a. The upper periphery 134a of the upper piece of material 134 is joined to the outer periphery 33a of top portion 33. The remaining ends of the two pieces 134, 135 are brought together at their ends and joined along a vertical seam 136 whereby skirt 34 and cords 37, 39 form closed loops around the outer periphery of top panel portion 33. Collectively, the two pieces of material 134, 135 defining the side skirt 34 have the same general dimensions as the side skirt 22 of the previously described embodiment 20. A first elastic cord 37, like elastic cord 27, is secured with the lowermost or outer periphery or free edge 34a of the side skirt 34, which is itself provided by the lowermost, outer periphery or free edge 135b of the second piece of material 135. A second elastic cord 39, like elastic cord 29, is positioned against and joined to the inner major side of the side skirt 34 between and spaced apart from the outer periphery 33a of the top portion 33 and the outer periphery 34a of the inelastic side skirt 34, preferably at the seam between the two pieces of material 134, 135.

The side skirt 34 of this embodiment 32 can be fabricated from separate pieces of different material such as a textile sheet material 134 and a less expensive, less attractive sheet of textile material 135 such as a nylon scrim, respectively. The side skirt 34 is thus preferably formed by two strips of material which encircle the sides and ends of the mattress in a closed loop. However, the side skirt 34 can be formed by joining together more than two separate pieces of material at least some of which do not extend entirely around the outer periphery 33a of the top portion 33. Both constructions permit the use of a more expensive and attractive layer of material 134, which is always visible for the upper portion of the side skirt 34.

Figure 11:
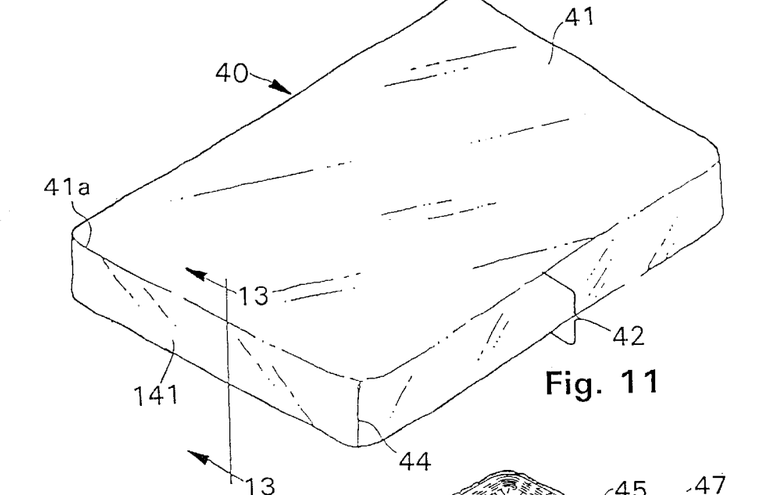
FIG. 11 is a perspective view of a mattress covering of a further form of the preferred embodiment of the present invention fitted on a mattress.
Figure 12:
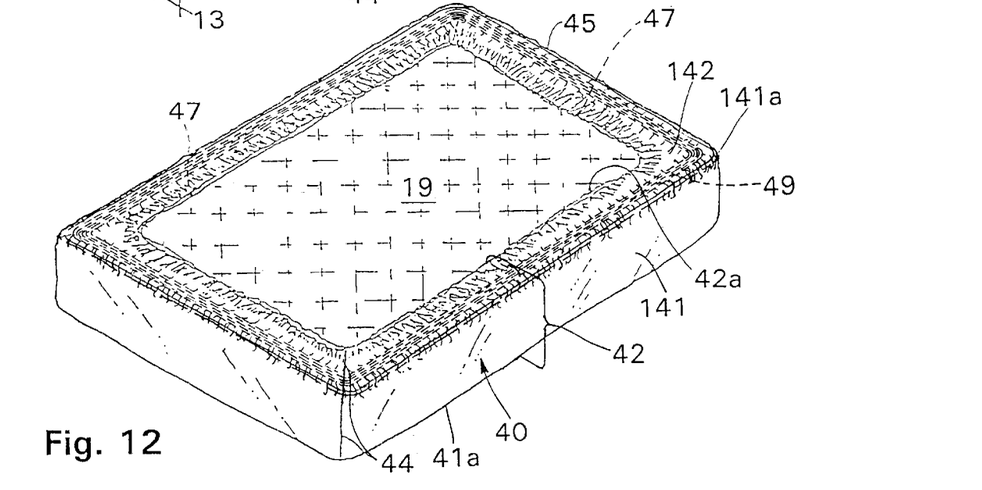
FIG. 12 is a perspective view of the mattress and covering of FIG. 11 as viewed looking toward the bottom of the mattress.
Figure 13:
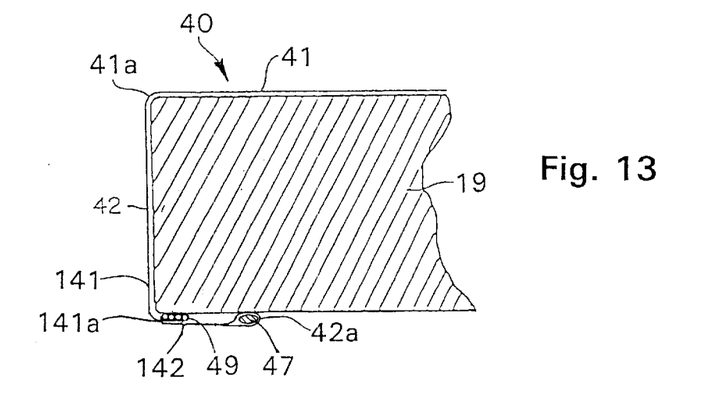
FIG. 13 is a partial vertical sectional view taken along line 13—13 of FIG. 11.

Mattress coverings of the present invention can also take the form of a fitted sheet as well as a mattress pad. The form of a preferred embodiment as a fitted sheet 40 is illustrated in FIGS. 11, 12 and 13. In this embodiment, the fitted sheet 40 has a top portion 41 with outer periphery 41a having dimensions generally the same as the predetermined dimensions of the top surface of a mattress of the size on which the sheet 40 is to be used to at least substantially cover top surfaces of mattresses of at least that one predetermined standard top surface size. This top portion 41 is formed preferably of a single piece of a single layer of a conventional, inelastic woven or unwoven textile sheet material. A side skirt 42 is formed by a single layer of an inelastic material which extends integrally from the outer periphery 41a of the top portion 41. If corners are seamed into the side skirt 42 as shown, the seamed corners 44 extend at least transversely and, preferably, generally perpendicularly and generally straight from the generally rectangular top portion 41.

A first elastic cord 47 is secured with the lower outer periphery 42a of the side skirt 42, remote from the outer periphery 41a of the top panel portion 41. Cord 47 extends at least partially and preferably entirely around the lower outer or free periphery 42a of the side skirt 42 while a second elastic cord 49 is secured with the sheet 40 between and spaced apart from the top portion outer periphery 41a and the side skirt outer periphery 42a, preferably as noted above with respect to the first mattress pad embodiment to facilitate retention of the sheet 40 in fitted disposition on any of the mattresses 19, 30, 31.

Figure 14:
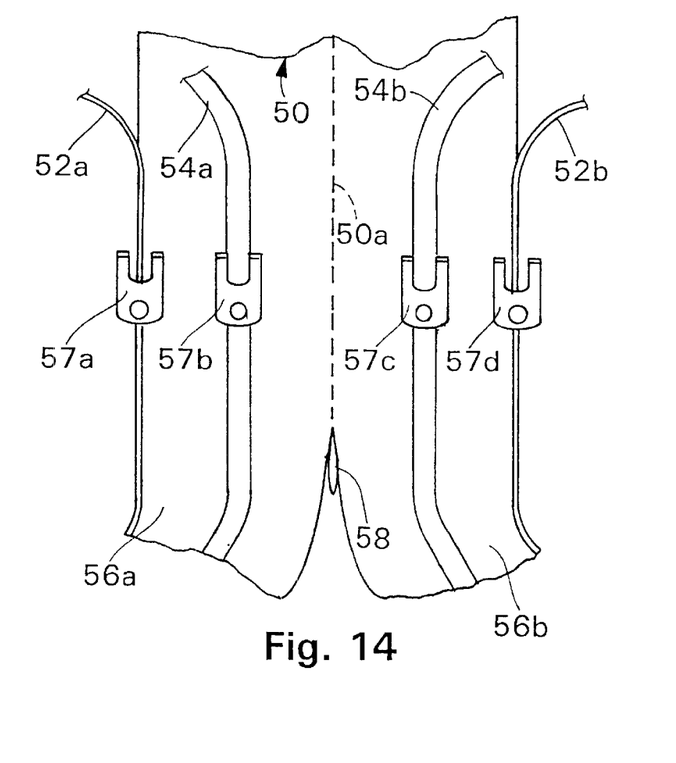
FIG. 14 depicts diagrammatically, elastic cords being attached with a continuous length of inelastic textile material.

The preferred method of making mattress coverings according to the present invention includes initially preparing a continuous side skirt bearing the two elastic cords. Skirts can be conveniently made automatically by machine in significant continuous lengths. At least two sewing machine heads are desired to continuously attach two separate lengths of elastic cord to an inelastic side skirt material. If multiple sewing machine heads are available, multiple skirts can be made simultaneously in parallel using a single continuous sheet of a single layer, inelastic side skirt material of sufficient width and cutting the material to appropriate individual side skirt widths. Preferably, two side skirts are simultaneously formed as shown in FIG. 14 from a single, continuous length of a width of cloth 50. First elastic cords 52a, 52b, which will form the lowermost cords of an applied side skirt, are joined to the outer edges of the continuous length of cloth 50, preferably by sewing with sewing machine heads 57a, 57d. Second, preferably flat elastic cords 54a, 54b, are laid down symmetrically with respect to the center line 50a of the cloth 50 spaced apart from the first cords 52a, 52b and the center line 50a and sewn by sewing machine heads 57b, 57c or otherwise joined to the cloth by appropriate means for the materials used. The first and second elastic cords 52a, 52b, 54a, 54b are preferably stretched as they are applied to the continuous length of cloth 50 and sewn with conventional, inelastic thread 50 or otherwise joined to the cloth. The cloth 50 is then split along its center line 50a by knife 58 to form two separate side skirts 56a, 56b.

Figure 15:
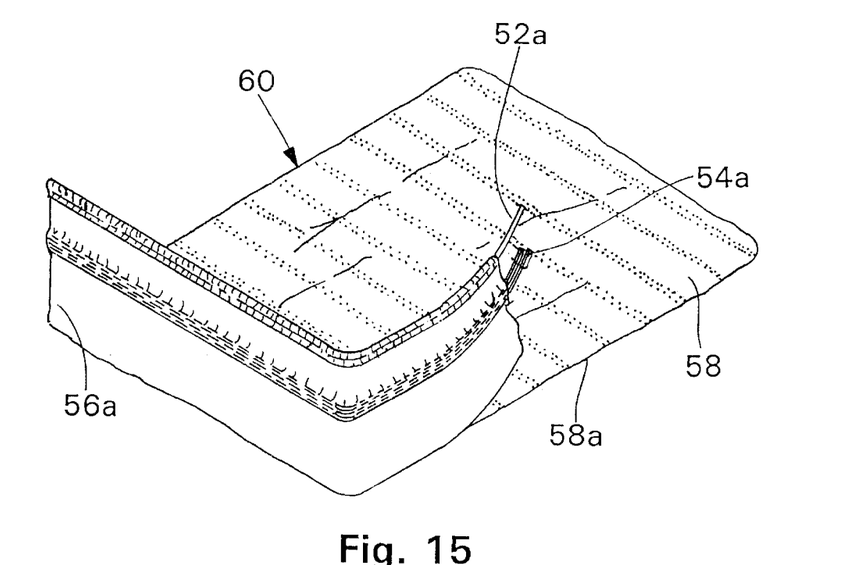
FIG. 15 is a perspective view of a mattress covering being fabricated by attaching a side skirt made in FIG. 14 to a generally rectangular piece of material.

Referring to FIG. 15, one of the side skirts 56a fabricated in FIG. 14 is attached along the outer periphery 58a of an inelastic, generally rectangular and planar, fabric panel forming a top portion 58, along the cut edge of the side skirt 56a, to form a mattress covering 60 of the present invention. The ends of the skirt 56a are brought together, preferably at one of the corners of the top panel portion 58, and joined by being sewn together, preferably sewing together at the same time the ends of the first elastic cord 52a and the ends of the second elastic cord 54a, to form a closed loop extending entirely around the outer periphery 58a of the top portion 58.

The method of construction described above and shown in the figures is preferred for inexpensive manufacture of mattress coverings of the present invention. However, it will be appreciated that the mattress covers of the present invention can be formed in other ways. For example, instead of attaching the first and second elastic cords to the inelastic side skirt material before that material is attached to the outer periphery of the top panel portion, an appropriate length of side skirt material can be attached all around the periphery of a top panel portion of material and the first and second elastic cords added to the side skirt after the side skirt has been attached. Alternatively, the one cord might be attached before and the other cord added after the side skirt material is joined with the top panel portion of material.

Also, where it is desired to provide a side skirt of two different materials (sometimes referred to as a side skirt and an under skirt) like fabric strips 134, 135 in FIGS. 8–10, two separate lengths of skirt material may be joined together at the same time with the second elastic cord so that all three extend parallel. The first elastic cord may be added before, after or at the same time that the two individual lengths of cloth forming the side skirt are joined together.

In yet another manner of construction, a single piece of material can be used to form both the top portion and the entire side skirt or the top portion and an upper portion of the side skirt. The latter type of construction is shown in mattress covering 40 of FIGS. 11–13. One rectangular piece of material can be provided, generally square cutouts made at the four corners of the material to define two side and two end panels which are then folded transversely from the remaining central portion of the cloth that defines the top panel portion and joined together along their edges to form four seamed corners 44 in FIGS. 11 and 12 of the mattress covering 40. The first and second elastic cords are then attached to the thus formed side skirts. Where the turned panels form only an upper portion of the side skirt as do panels of the material forming top portion 41 and upper side portion 141 of covering 40 in FIGS. 11–13, another length of material is joined to the lower free periphery of that upper portion (e.g. material 142) in a closed loop to form a lower portion of the side skirt or an "underskirt". The first and second elastic cords can be attached before, during or after the other length of material is joined.

Finally, separate pieces of inelastic fabric material might be substituted for any or all of the transversely folded panels, which are described above as being provided by edge portions of the one piece of material that also defines the top panel portion of the covering. The material forming the top portion may also provide portions of the side skirt on only some of the sides of the resulting cover. One or more separate panels would then be joined to the remaining sides or ends of the top panel portion and transversely folded panels, as appropriate, and all stitched together.

Preferably all elastic cords extend entirely around the perimeter of the mattress covering. However, it is recognized that one or more of the cords could be extended around only a portion of the covering perimeter or may be provided by several separate portions which collectively extend only part way or entirely around the skirt perimeter to provide further cost saving or to attempt to avoid patent infringement or possibly other reasons. All such constructions are intended to be covered by the present invention.

The elastic cords can be sewn directly to inelastic fabric in a conventional fashion by stretching them to their full length or essentially their full length while sewing them to the inelastic fabric with inelastic thread. The elastic cords can also be secured with the skirt material by locating a cord in a fold or sleeve formed from the skirt material. If the cords are an elastomer strip, the cords may also be adhered with the skirt material. For example, the cords could be stretched and spot bonded with the skirt material, depending upon the materials of the skirt and of the elastic cord. The bonding means may be an adhesive or solvent or a direct ultrasonic or thermal weld between the elastic cord or skirt material.

Elastic cords as referred to in this application are items which are much heavier than ordinary elastic thread and too large to be passed through needles of sewing machines in order to be stitched themselves into the skirt material as thread. These elastic cords may be lengths of raw or covered rubber. The first elastic cords attached to the lower most or outer periphery of the side skirts may be flat or round in cross section and, if round, may be formed by several smaller individual rubber strips which are bound together in a cover.

The second or intermediate cords are preferable straps formed of a single flat strip of latex or "raw" rubber or another solid elastomer material or one knitted or woven of elastic thread(s) or elastic and inelastic threads which, after knitting or weaving, are also no longer capable of being passed through a sewing machine. Because they cannot be stitched directly into fabric themselves, some other means must be provided to join them to the skirt material, such as ordinary inelastic thread. The second cords are also generally flat having a thickness dimension and a width dimension which is perpendicular to the thickness dimension and which is greater than the thickness dimension, at least twice, more typically many times greater, desirably at least five and preferably at least ten times greater than the thickness dimension of the strap. Such cords are available in a variety of widths and the greater their width, the more area of the mattress they contact and grip. Suggestedly, the width of the second elastic cord along the side skirt and mattress perimeter is at least one-quarter inch wide, particularly for solid latex or "raw" rubber or other solid, one piece elastomer strip, desirably at least about three-eights inch and preferably at least about one-half inch for a knitted or woven strap to firmly grip the mattress and keep the covering in position with little if any movement of the covering on the mattress in normal use. At the same time, the side skirt has a width dimension extending between the outer periphery of the top panel portion of the covering with which the side skirt is joined and the remote free (lower) periphery of the side skirt where the first elastic cord is located, which is many times greater, desirably at least ten and typically twenty or more times greater than the width of the second, intermediate elastic cord member. For example, a woven elastic strap one-half inch wide and about one-twentieth of an inch thick or a solid elastomer strip one-quarter inch wide and about the same thickness can be attached to a fourteen inch wide inelastic piece of textile fabric by sewing to provide an elasticized side skirt of the present invention. As is best seen in FIGS. 3, 10 and 13, the strap is joined with the side skirt material and with the width dimension of the strap parallel to the width dimension of the side skirt, preferably on the inner major side of the side skirt, to minimize the bulge of the strap along the side skirt and to cover and otherwise hide its presence.

It has been found that the provision of a single elastic cord, preferably a conventionally fabricated flat strap, at least one-quarter inch wide, intermediate the edges of the side skirt and preferably closer to the top portion than to the remote free end of the side skirt, will provide a mattress covering which will grip mattresses of substantially all currently supplied heights and extend under most mattresses at least as well as would prior mattress covers which have been made elastic over the full height of their side skirts to be commercially acceptable.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred and other embodiments, it is to be understood that this disclosure is only illustrative and exemplary of the present invention and is made merely for purposes of provided in a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A mattress covering adapted for fitted disposition over the top, sides, ends and corners of mattresses of standard top surface sizes comprising:

an inelastic, generally rectangular top portion having an outer periphery dimensioned to at least substantially cover the top surface of mattresses of at least one predetermined standard top surface size;

an inelastic side skirt extending transversely to the generally rectangular top portion from the outer periphery of the generally rectangular top portion around the entire outer periphery of the top portion;

an inelastic panel extending away from a periphery of the side skirt remote from the top portion and entirely around the side skirt periphery, the inelastic panel being separate and different from the side skirt and being attached to the periphery of the side skirt remote from the top portion;

a first elastic cord secured with the inelastic panel at a periphery of the panel remote from the side skirt.

2. A mattress covering adapted for fitted disposition over the top, sides, ends and corners of mattresses of standard top surface sizes comprising:

an inelastic, generally rectangular top portions of multilayer material having an outer periphery dimensioned to at least substantially cover the top surface of mattresses of at least one predetermined standard top surface size;

an inelastic side skirt formed in one piece with the top portion from the multilayer material and extending transversely to the outer periphery of the top portion from the outer periphery of the top portion around the entire outer periphery of the top portion;

a separate panel formed by at least one layer of non-elastic textile fabric attached to and extending away from a periphery of the side skirt remote from the top portion and entirely around the side skirt periphery; and a first elastic cord secured to the inelastic panel at a periphery of the panel remote from the inelastic side skirt.

3. The mattress covering of claim 2 wherein said first elastic cord extends entirely around the periphery of the panel.

4. A mattress covering adapted for fitted disposition over the top, sides, ends and corners of mattresses of standard top surface sizes comprising:

an inelastic, generally rectangular top portion having an outer periphery dimensioned to at least substantially cover the top surface of mattresses of at least one predetermined standard top surface size;

an inelastic side skirt extending transversely from the outer periphery of the generally rectangular top portion around the entire outer periphery of the top portion;

an inelastic underskirt, separate and different from the side skirt, attached to and extending away from the periphery of the side skirt remote from the top portion, entirely around the side skirt periphery; and a first elastic cord secured to the inelastic underskirt at a periphery of the underskirt remote from the side skirt.

* * * * *